Patented May 9, 1939

2,157,645

UNITED STATES PATENT OFFICE 2,157,645

METHOD OF MAKING A PLASTIC COMPOSITION

Manuel R. Ximenez, Plainfield, N. J., assignor to Johns-Manville Corporation, New York, N. Y., a corporation of New York No Drawing. Application March 14, 1936, Serial No. 68,886

1 Claim. (Cl. 106—40)

This invention relates to the method of making a plastic composition.

A preferred embodiment of the invention comprises forming a mixture of the selected base material, water, and particles of finely divided filler in individualized spaced relationship to each other, filtering excess water from the said mixture, and subjecting the product to treatment to cause softening of the said material and intimate association of the filler therewith.

The invention is applicable to the making of various plastic compositions including finely divided filler and plastic base materials of which vinyl resins, phenol aldehyde condensation products, cellulose esters and ethers, such as benzyl or ethyl cellulose, and chlorinated rubber are examples.

In the practice heretofore prevailing in the manufacture of some of the plastic compositions of the class described, there has been utilized a large proportion of volatile solvent, an elevated temperature, and/or elaborate mixing steps, to produce intimate association of the selected filler and base material. Thus, in the manufacture of cellulose acetate plastics, all of these expedients have been employed. It has been customary to colloid the acetate in the presence of a volatile organic fluid, usually a mixture of an alcohol, ester, and ketone, and a plasticizer, as, for example, a phthalate ester, sulfonamid, triacetin, an organic phosphate or the like. In any case, there has been used a large proportion of the volatile fluid or solvent that must be evaporated subsequently, during the finishing steps in the manufacturing process. Also, there has been required extensive mixing steps and machinery.

In making many plastics, the conventional operations, such as rolling and cake-pressing, frequently require a temperature sufficiently high to cause discoloration or other undesirable changes in the composition.

It is an object of the invention to provide a simplified process of making plastic compositions, substitute water or other inexpensive non-solvent, and/or minimize discoloration of light shades of heat-discoloring plastic materials. Other objects and advantages will appear from the description that follows.

The invention is illustrated by the following specific examples of methods of making plastic compositions.

A cellulose ester plastic is made as follows.

There is first formed a mixture of the undissolved cellulose ester, water, filler and a substantially non-volatile solvent (plasticizer) for the ester. A typical mixture that may be used comprises cellulose acetate 100 parts by weight, plasticizer 40 parts, finely divided diatomaceous earth 35 parts, water 1200 to 2500 parts, and coloring material to establish color desired.

The proportion of non-volatile solvent used is that which is adapted to give the desired consistency or pliability in the finished plastic.

The proportion of water used is adequate to form a suspension of the other ingredients and, particularly, to individualize or separate the particles of filler, so that they are in spaced relationship to each other. In such a suspension, the particles of filler are surrounded individually by water. There is thus minimized objectionable agglomeration and non-uniform distribution of filler in the finished plastic.

The plasticizer, such as one of those mentioned above, may be used as a vehicle for grinding of the coloring material, such as a dye or pigment. Also, the plasticizer and coloring material, if the latter is used, are thoroughly dispersed in the water before the cellulose acetate is added. Suitably, the filler and acetate are previously associated as described in my Patent 2,009,600, issued July 30, 1935; this mixture of acetate and filler, washed till acid-free but preferably not dried, is incorporated into the aqueous dispersion of plasticizers.

There should not be used an order of mixing of the several ingredients that will cause softening or solution of the selected base material before it becomes thoroughly mixed with the other ingredients present. Thus, the plasticizer should not be allowed to come into contact with the base material until water is introduced. An order of mixing that has been used with satisfaction includes preforming an emulsion of the plasticizer and water and then adding thereto the composition including the base material and filler.

The base material, as incorporated into the mixture, should be in the form of powder and non-colloidal, as illustrated, in distinction from large compact masses, so that the fluent aqueous suspension of the other ingredients may be properly mixed with the said material.

After the mixture is made intimate, as by vigorous stirring, it is subjected to filtration to remove excess water therefrom and form the resulting mass of the other ingredients into a filter cake. This filtration is effected, conveniently, under the influence of a partial vacuum on the filtrate or pressure on the mixture supplied to the filter.

The product from the filtration or the filter cake is dried and subjected to treatment to cause softening of the base material, as by forming a colloidal solution in the non-volatile solvent and intimate association of the filler therewith, to give a unitary, bonded product. Thus, the mixture may be dried at an elevated temperature, say, about 90 to 150° F., for a period of three hours or longer. The dried product is heated and compressed, as in a mold at 250 to 300° F., to cause softening of the base material by colloiding and consolidate the several ingredients present.

For special purposes, the dry or wet mixture may be heated without compression in a mold, in a form or on a treated or untreated surface at 250 to 300° F., to cause softening of the base material by colloiding and consolidate the several ingredients present.

After this treatment is completed, the consolidated product may be allowed to cool, to cause hardening.

Other thermo-non-setting base materials in finely divided form, such as cellulose ethers, chlorinated rubber and vinyl resin, may be used as a substitute for cellulose acetate in the above example. The plasticizer selected for use with a given base material may be one conventionally used with such material. The base materials are water-insoluble.

In making a plastic composition including a phenol aldehyde condensation product or other heat-softenable and then heat-hardenable plastic base material, I use a modification of the general process described above. Thus, there may be formed a mixture of finely divided phenol formaldehyde resin 48 parts by weight, finely divided diatomaceous earth 48 parts, an internal lubricant for the resin, such as calcium stearate, 2 parts, a coloring ingredient, say, a suitable dye, 2 parts, and water 200 to 500 parts. The dye or lubricant may be omitted if its function is not desired. Plasticizers and/or hardening agents may be added.

The mixture is made intimate and is then subjected to filtration to remove excess water and leave a wet filter cake. The product or wet filter cake is then dried by being subjected to a moderately elevated temperature, as, for example, 75 to 125° F., for three hours or more.

The dried product is then molded under pressure to desired shape, either with or without preliminary crushing, powdering, or tableting of the material. The molding is effected at an elevated temperature such as 275 to 350° F., to soften the base material and cause intimate association with the filler and other ingredients present, and then to harden the said material.

For special purposes, the dried product may also be cured without pressure, in forms or on treated or untreated surfaces and the like, either with or without preliminary crushing, powdering or tableting of the material. This curing is effected at an elevated temperature such as 225 to 350° F., to soften the base material and cause intimate association with the filler and other ingredients present and then to harden the said material.

If desired, the filtering and shaping steps may be combined, as by compression of the wet composition in a filtering mold.

This process avoids the use of hot mixing rolls and, thus, sticking, contamination and/or discoloration produced in the rolling steps and makes possible the manufacture of the composition in large but uniform batches. Also the process makes possible the use of a quicker curing resin since there is obviated, by eliminating the rolling, the danger of excessive premature curing before the final molding.

Because of its very small average size of particles and ease of being suspended in water, comminuted diatomaceous earth, say, of filtration powder grade or finer, is particularly desirable as the filler in the present process. For some purposes, however, there may be used other filler materials in finely divided form, as, for example, talc, whiting, asbestos, wood flour, mica, clay, or the like.

Compositions made as described herein are useful as shaped articles of various kinds.

By the improved process described, filler may be incorporated in very large proportions that are substantially greater than heretofore feasible.

It will be understood that the details given are for the purpose of illustration, not restriction, and that variations within the spirit of the invention are intended to be included in the scope of the appended claim.

What I claim is:

A method of making molded articles which comprises forming an intimate mixture of diatomaceous earth and cellulose acetate by precipitating the acetate in uncolloided form from a cellulose acetate solution through the use of a precipitating medium in the presence of a suspension of diatomaceous earth and separating the precipitating medium from the mixture, adding said mixture to an aqueous dispersion of a cellulose acetate plasticizer and forming an intimate admixture therewith, filtering the mixture thus formed, and subjecting the resultant product to an elevated temperature, to form a solution of the acetate in the plasticizer and cause intimate association of the said solution and diatomaceous earth.

MANUEL R. XIMENEZ.